US008585785B2

(12) United States Patent  (10) Patent No.: US 8,585,785 B2
Brusletto et al.  (45) Date of Patent: Nov. 19, 2013

(54) PROCESS FOR PRODUCING FUEL PELLETS

(75) Inventors: Rune Brusletto, Jar (NO); Odd Egil Solheim, Hvalstad (NO); Hans Rasmus Holte, Reistad (NO)

(73) Assignee: Arbaflame Technology AS and Cambi Technology AS (NO)

( * ) Notice: Subject to any disclaimer, the term of this patent is extended or adjusted under 35 U.S.C. 154(b) by 1294 days.

(21) Appl. No.: 11/571,761

(22) PCT Filed: Jun. 16, 2005

(86) PCT No.: PCT/NO2005/000212
§ 371 (c)(1), (2), (4) Date: Aug. 23, 2007

(87) PCT Pub. No.: WO2006/006863
PCT Pub. Date: Jan. 19, 2006

(65) Prior Publication Data
US 2009/0223119 A1    Sep. 10, 2009

(30) Foreign Application Priority Data
Jul. 8, 2004  (NO) .................................. 20043071

(51) Int. Cl.
*C10L 5/04* (2006.01)
*C10L 5/44* (2006.01)

(52) U.S. Cl.
USPC .................. 44/550; 44/594; 44/589; 44/605; 44/606

(58) Field of Classification Search
USPC ........... 44/550, 589, 590, 593, 594, 596, 597, 44/605, 606, 595
See application file for complete search history.

(56) References Cited

U.S. PATENT DOCUMENTS

| 3,533,906 A | * | 10/1970 | Reiniger | 162/13 |
| 4,211,740 A | | 7/1980 | Dean et al. | |
| 4,290,269 A | | 9/1981 | Hedstrom et al. | |
| 4,502,227 A | | 3/1985 | Janusch | |
| 4,751,034 A | * | 6/1988 | DeLong et al. | 264/115 |
| 5,888,307 A | * | 3/1999 | Solheim | 127/37 |
| 2006/0093713 A1 | * | 5/2006 | Jurkovich et al. | 426/511 |

FOREIGN PATENT DOCUMENTS

| FR | 2206701 | | 6/1974 |
| GB | 2402398 | A | 12/2004 |
| WO | 9951710 | A1 | 10/1999 |

\* cited by examiner

*Primary Examiner* — Pamela H Weiss
(74) *Attorney, Agent, or Firm* — Brooks Kushman P.C.

(57) ABSTRACT

A method for production of fuel pellets from a biological material, preferably saw dust, wood or similar, where the method comprises the following steps: supplying the material to a drying step (1) and dry the material to a relative humidity from 40-65 weight-percent to 30-45 weight-percent; supplying the material from the dryer step (1), optionally via an intermediate storage step (2), to a reactor step (3, 3') and heat the material to 200-300° C. by supply of steam; keeping the material in the reactor at the achieved temperature in sufficient time to soften the material; reducing the pressure of the reactor step (3, 3') in at least two steps, in order to defibrate the material and release of lignin, and supply the material from the reactor step (3, 3') to an additional drying step (5), optionally via an intermediate storage step (4), and optionally pelletizing of the material.

10 Claims, 2 Drawing Sheets

PROCESS FOR PRODUCING FUEL PELLETS

Figure 1:
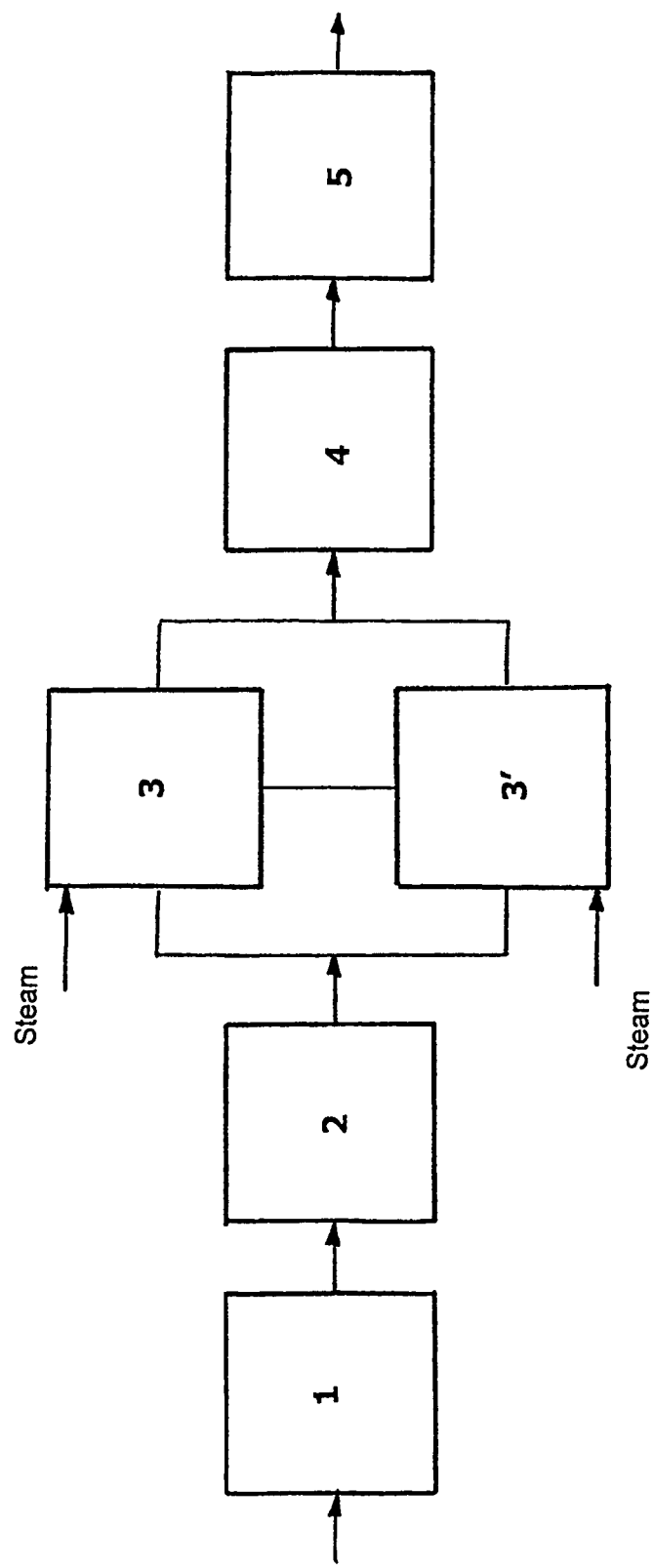

The present invention is directed to a process for producing fuel pellets of biological materials, preferably sawdust, wood and similar materials.

In the context of present invention, the fuel pellets is meant to be a pelletized substance of biological material, such as tree bark, wood, saw dust etc., which can be used in fuel plants for heating purposes, steam production and as a reducing agent.

During recent years, there has been an increasing focus on environment and especially emissions of "fossil" $CO_2$. In many countries, great efforts are made in the transformation from use of fossil energy sources, such as oil, gas, coal and coke, to biological or renewable energy sources, in order to reduce the emissions of "fossil" $CO_2$ in the individual country.

Traditional biological energy sources are tree bark and wood chippings, and many plants have been built to utilize these resources. These plants are preferably built in industrialized areas and in large central heating plants in cities having industry where the resources are available at low costs.

It is known to produce fuel pellets from saw dust and other combustible organic material. These known solution have mainly been aimed at supplying the saw dust into a reactor, for subsequent addition of steam to increase the temperature, provide a sufficient retention time and subsequent pressure reduction and emptying of the reactor such that the lignin of the wood is released and forms a coating on the particles. Subsequently the material is dried in sufficient extent in order to be pelletizable. Finally the pellets are produced by means of a pellets press. These known solutions are very energy demanding and if the moisture content of the infeed material is high, the capacity of the plant will be greatly reduced. The reason for this is that both water and dry substance have to be heated in the reactor. By high moisture content in the infeed material, more steam than necessary will be supplied, and this will cause a larger amount of steam to condense and consequently make the material even more humid. This will result in a large consumption of steam and energy loss. Increased content of water in the material coming out of the reactor will cause higher energy consumption and longer retention time in the subsequent drying process, and thus reduce the capacity.

A drawback with these prior solutions has been a poor cohesion ability of the end product and the result of this has been that the pellets disintegrate before use and additionally the combustion of the pellets produces a large amount of ash dust. The dust may have great environmental impact and requires treatment in order to prevent the dust to pollute the air and the working environment.

Another drawback has been that the required drying process after the material has passed through the reactor is slow and very energy consuming.

From U.S. Pat. No. 4,502,227 there is known a continuous process for treatment of organic material, especially coal, where the organic material is led to a preheating stage where an aqueous suspension or sludge is being produced, which subsequently is pumped to an autoclave or reactor. After the autoclave, the material is led to a drying step and thereafter to an upgrading step. The organic material, optionally after a pressure reduction, is pelletized under pressure.

Form U.S. Pat. No. 4,211,740 there is known a method for producing fuel pellets from botanical material, where the material is being heated and subsequently pelletized.

The objective of present invention is to provide a method for producing fuel pellets, said method prevents disintegration of the pellets and formation of large amounts of ash dust. Another objective is the possibility to produce fuel pellets without the need for additives in order to avoid dust formation and disintegration. A further objective is to provide a method and device of the above mentioned type which result in a minimal energy consumption.

These and other objectives of the invention is achieved by a method for producing fuel pellets of a biological material, preferably saw dust, wood and similar, which is characterized by:

feeding the material to a drying step, and dry the material to relative humidity from 40-65 weight-% to 30-45 weight-%;

feeding the material from the drying step, optionally via an intermediary storage step, to a reactor step and heating the material to 200-300° C. by supply of steam;

keep the material in the reactor at the achieved temperature for a time sufficient to soften the material;

relieve the pressure in the reactor step in at least two steps, in order to defibrate the material and release lignin, and feed the material from the reactor step to yet another drying step, optionally via an intermediate storage step; and optionally pelletize the so treated material.

The retention time of the material in the drying step is preferably in the order of 1-3 seconds.

The retention time of the material in the reactor step is in the order of 1-15 minutes.

The reactor step preferably comprises at least two reactors and the pressure relief in the first step is obtained by feeding the surplus steam from the pressure relief of one of the reactors to the other reactor and the remaining pressure in the reactor being used to feed the material out of the reactor.

The invention will be more fully explained by the following description of an exemplary embodiment with reference to the enclosed drawings, where FIG. 1 is a block diagram which schematically shows the various steps of the method according to the invention.

Figure 2:
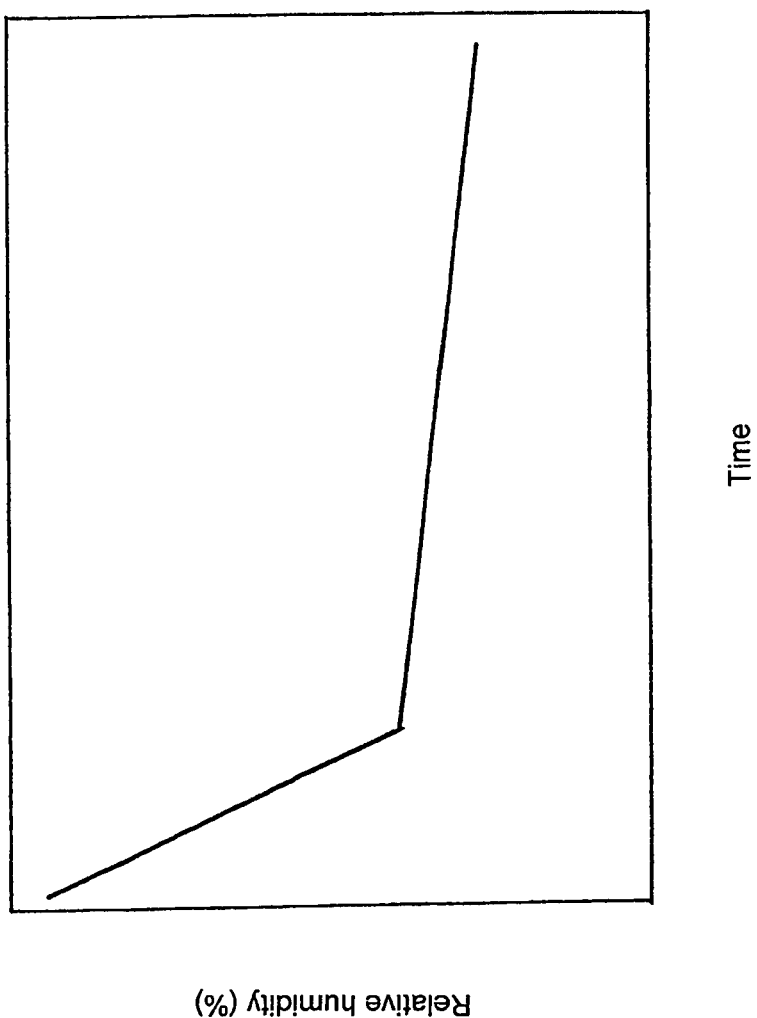

FIG. 2 is a graph showing the drying progress as a function of time.

In FIG. 1 it is depicted the various steps of the method according to the invention. The organic material to be treated is fed to a pre-drying step 1. The pre-drying step can typically comprise a so called flash dryer. The organic material typically contains a humidity of 40-65 weight-percent. In the pre-drying step 1, the organic material is heated to a temperature typically higher than 100° C. during approx. 1-3 seconds. The result of this is that the surface humidity of the particulate organic material is being reduced and the material that exits the drying step typically has a humidity content of 30-45%.

The purpose of the drying step 1 is to remove "free water" from the particles. This free water is water in the surface layer of the particles and water present in open pores in the particles of the organic material. The purpose with this quick drying is to remove as much of the free water as possible, in order to reduce the heat requirement by the subsequent heating in the reactor, and additionally retain sufficiently amounts of tied-up water in the particles in order to make the particles capable to burst at the subsequent pressure relief. This will cause a portion of the lignin to be released and this lignin will act as a binding agent at the later pelletizing.

After the drying step, the organic material is fed to an intermediate storage or buffer step 2. The buffer step 2 can comprise one or more intermediary storage vessels. From the buffer step 2, the material is fed into a reactor step 3. The reactor step 3 can comprise one and preferably several reactors. In the case of two or several reactors, these can be connected in parallel and operate on a batch wise manner. The function of the reactor step 3 will be explained below with two reactors 3, 3' connected in parallel. The material from the buffer step 2 is led into the first reactor 3. Steam is supplied to the first reactor 3 and the material is heated to 200-300° C. during typically 1-15 minutes. This heating will cause the material to soften. Simultaneously as the first reactor is pressurized with steam, the material from the buffer step 2 is fed to the second reactor 3'. When the material in the first reactor 3 has achieved sufficient retention time and temperature, the pressure in the first reactor 3 is reduced in two steps. This will cause defibration and the lignin in the material will be released. In the first step, the pressure in the first reactor will typically be halved and the steam being supplied to the second reactor 3'. The second reactor 3' is supplied with additional steam, in order to achieve a temperature of typically 200-300° C. in the second reactor. The material in the first reactor 3 is led out of the reactor by means of the remaining pressure and is supplied to an additional buffer step 4. Subsequently the first reactor is supplied with additional material, and by pressure relief of the second reactor 3', the surplus steam from this will be supplied to the first reactor 3. The first reactor 3 is supplied with additional steam, and the whole sequence is repeated.

From the buffer step 4, which can comprise one or several intermediary storage vessels, the material is supplied to a dryer 5, where the humidity is reduced to typically lower than 15-20 weight-%. The retention time in the dryer 5 is typically 15-60 minutes. From the dryer 5, the material can be supplied to a pellets press where pellets is produces as end product.

Due to the release of the lignin in the material during the treatment in reactor step 3, it is not necessary to supply additional binding agent.

FIG. 2 is a graph showing a typical drying progress for particles of organic material. As the graph shows, a reduction of humidity is not linear in relation to time. The humidity will initially decline rapidly, since the humidity of the surface of the particles will disappear quickly. As soon as the surface humidity has been removed, the humidity within the particles will have to diffuse out towards the surface, and consequently the removal of internal humidity within the particles will be removed considerably slower. Consequently the graph will have a pronounced flattening as soon as the surface humidity has been removed. A possible way to optimize this drying is to us a two-stage drying, where the first stage is supplied with a large amount of air and heat and the second stage has an extended retention time. Such an optimization will result in the possibility to obtain larger capacity in both the drying stages with an accompanying reduction of the energy consumption. When the material is drier, i.e. a relative humidity of 35-45 weight-percent according to the invention versus 45-65 weight-percent by traditional processes, it will nevertheless be sufficient residual humidity in the material to allow the material to be defibrated in pressure vessels supplied with steam with a subsequent pressure reduction.

The invention claimed is:

1. Method for production of fuel pellets from a biological material, comprising:
   supplying biological material having a relative humidity from 40-65 weight-percent to a flash dryer;
   pre-drying the biological material to 30-45 weight-percent relative humidity by heating the material to at least 100° C. for 1-3 seconds to remove free water from the surface of the biological material;
   transferring the pre-dried material to a reactor;
   pressurizing the reactor and heating the material to 200-300° C. using steam;
   maintaining the material in the reactor at the achieved temperature in sufficient time to soften the material;
   reducing the pressure of the reactor in at least two steps, a first pressure reduction step in order to defibrate the material and release of lignin, whereupon the material is heated to 200-300° C. using steam and after a period of time a second pressure reduction step occurs enabling the removal of the material from the reactor;
   drying the material removed from the reactor; and
   pelletizing of the dried material.

2. Method according to claim 1 wherein the step of drying the material removed from the reactor dries the material to 15-20 weight percent relative humidity.

3. Method according to claim 2 wherein the step of drying the material is carried out over a period of 15-60 minutes.

4. Method according to claim 1 wherein the step of pelletizing of the dried material is done without supplying additional binding agent.

5. Method according to claim 1 wherein the biological material is wood saw dust.

6. Method according to claim 1 wherein the first pressure reduction step reduces the pressure of the reactor about 50%.

7. Method according to claim 1 characterized in that wherein the material is maintained in the reactor at the achieved temperature for about 1-15 minutes.

8. Method according to claim 7, characterized in that wherein the pressure reduction in the reactor is carried out in at least two reactors oriented in parallel and that the pressure reduction in the first step is performed by supplying surplus steam from the pressure relief of one of the reactors to the other reactor and that the remaining pressure in the reactor is being used to feed the material out of the reactor.

9. Method according to claim 1, characterized in that wherein reactor step comprises is carried out in at least two reactors oriented in parallel and that the pressure reduction in the first step is performed by supplying surplus steam from the pressure relief of one of the reactors to the other reactor and that the remaining pressure in the reactor is being used to feed the material out of the reactor.

10. Method according to claim 1, characterized in that wherein the pressure reduction in the reactor is carried out in at least two reactors oriented in parallel and that the pressure reduction in the first step is performed by supplying surplus steam from the pressure relief of one of the reactors to the other reactor and that the remaining pressure in the reactor is being used to feed the material out of the reactor.

* * * * *